Inventor
Arthur B. Osgood
By Caswell & Lagaard
Attorneys

Patented June 19, 1934

1,963,375

UNITED STATES PATENT OFFICE 1,963,375

DUST COLLECTING APPARATUS FOR BELT CONVEYERS

Arthur B. Osgood, Minneapolis, Minn., assignor to The Day Company, Minneapolis, Minn., a corporation of Minnesota Application December 5, 1930, Serial No. 500,276

1 Claim. (Cl. 209—147)

My invention relates to improvements in dust collecting apparatus for belt conveyers.

In connection with grain conveyer belts discharging into spouts, it is common to arrange a suction hood over the end pulley of a belt, immediately in advance of the head of the spout, for the purpose of picking up from the grain laden belt light dust, which otherwise is often diffused into the room by the back pressure of air occurring within the head of the spout. Together with such a hood, a drip funnel is used for catching the chaff, grit, heavy dust, and any whole grain, which fails to enter the spout and falls from the belt in making the turn over the pulley. The hood is connected by means of a pipe with a suction main. The drip funnel is arranged to discharge into a separate pipe through the top wall thereof, such pipe being open at its end and, like the pipe to the hood, being connected with the suction main, both pipes being relatively large and the capacity of the suction main and its fan and driving motor being relatively great to create a flow of air in sufficient volume to entrain the light dust at the hood and to carry away through the drip funnel pipe the chaff, grit, heavy dust and grain entering the same through the drip funnel.

It is an object of my present invention to provide an improvement in dust collecting apparatus of the present character, whereby the desired results may be attained in a construction of minimum initial cost and of minimum maintenance requirements.

More specifically, it is an object of my invention to arrange the parts so that the drip funnel feeds into the pipe from the hood to the main, through a restricted passageway, whereby the flow of air through the hood, in transit to the main, is employed to entrain the material from the drip funnel to said main, a feature of the invention, residing in such construction, being to eliminate the usual separate pipe for carrying away the discharge from the drip funnel and, correspondingly, to conserve in the size of fan and motor equipment at the suction main and in the power required to drive the motor.

With the foregoing and other objects in view, which will appear in the following description, the invention resides in the novel combination and arrangement of parts and in the details of construction hereinafter described and claimed.

Figure 1:
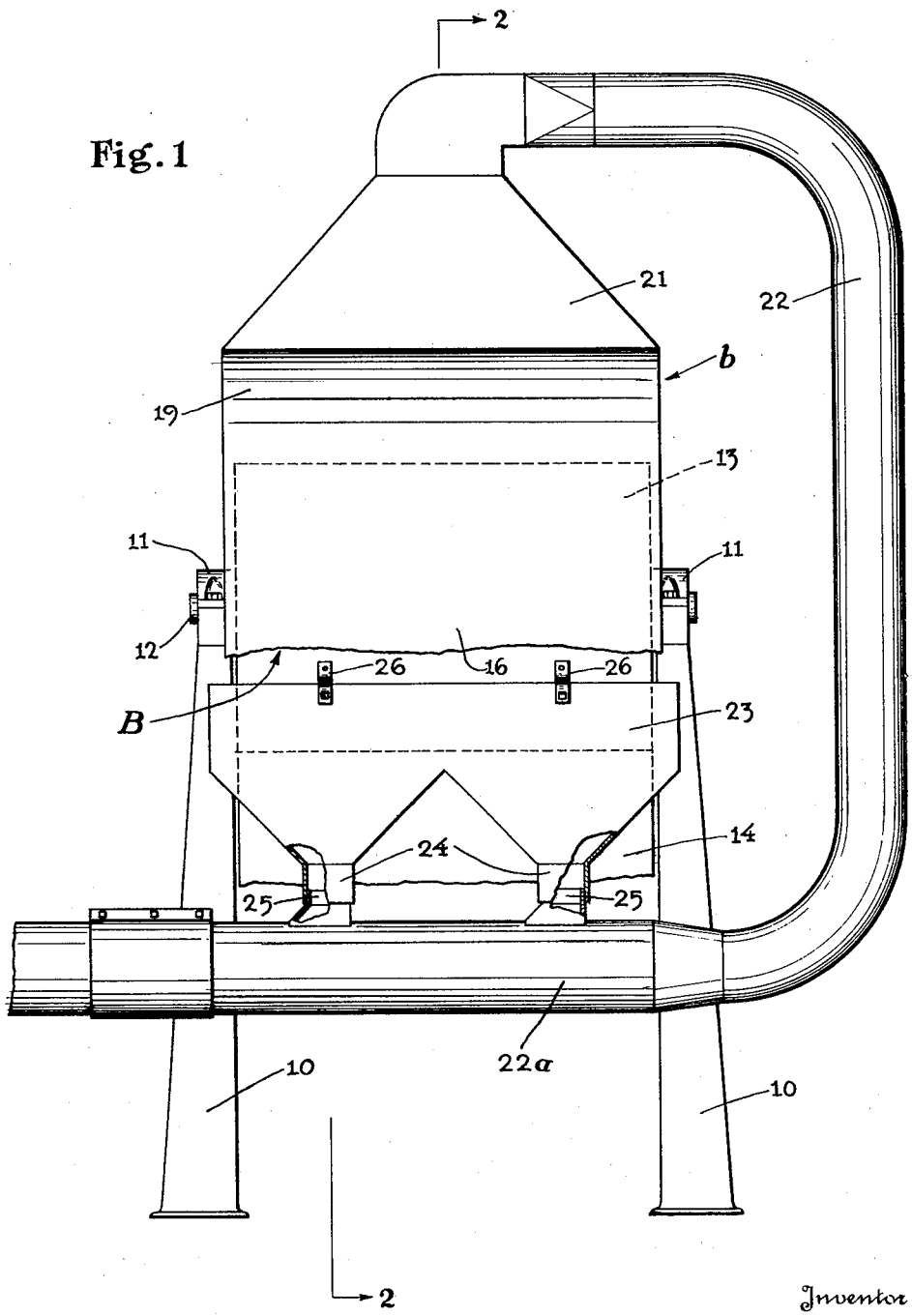
Figure 2:
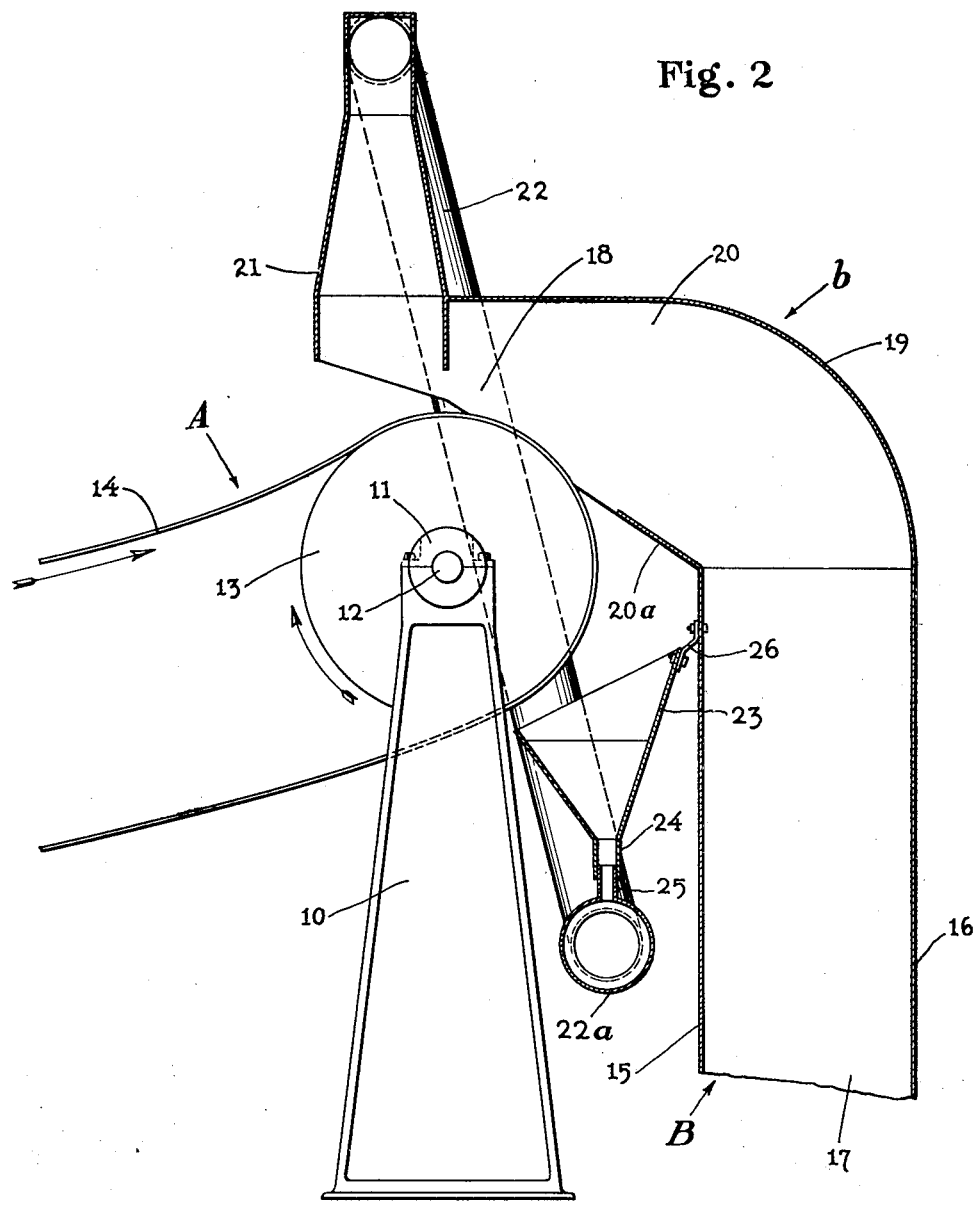

In the drawings, Fig. 1 is a rear elevational view of apparatus embodying my invention, the same being illustrated in connection with the discharge end of a belt conveyer, and Fig. 2 is a vertical longitudinal sectional view taken as on the line 2—2 of Fig. 1.

Reference being had to the drawings, it will be noted that the illustrated portion of the belt conveyer, generally indicated by the reference letter A, includes pedestals 10 surmounted with bearings 11 in which a pulley shaft 12 is journaled. Mounted upon this shaft, between the bearings 11 and their supporting pedestals 10, is a pulley 13 constituting an end support for a conveyer belt 14 over which said belt turns in its travel. Grain carried by this belt is discharged into a spout B, the body of which has a front panel 15, back panel 16 and side panels 17. Constructed at the top of the spout body is a head $b$ providing a mouth 18 for the reception of grain discharged from the belt 14 as it makes its turn over the pulley 13. This head $b$ includes a hooded top 19, sides 20 and an inclined throat wall $20^a$, which, at its upper edge, falls short of the turn of the belt 14 to provide ample clearance for the belt.

Immediately in advance of the mouth 18 of the head $b$ is a suction hood 21, which is connected by means of a pipe 22 with a suction main (not shown). This pipe 22 extends outwardly from the hood 21, thence downwardly, thence back in a horizontal reach $22^a$ beneath the turn of the belt 14 and thence in any suitable fashion to a convenient point of connection with the suction main, the horizontal reach $22^a$ of the pipe 22 and beyond being enlarged to increase its capacity for a purpose soon to appear.

Beneath the turn of the belt 14 is a drip funnel 23 of twin construction, the same having two restricted outlets 24 which connect with nipples 25 issuing upwardly from the horizontal reach $22^a$ of the pipe 22, the far sides of said nipples, in relation to the direction of flow of air through the pipe, being flared in such direction for the purpose of reducing resistance to the inflow of air from the drip funnel 23 to said pipe reach $22^a$. As shown, this drip funnel 23 is secured at its upper portion to the front panel 15 of the spout B by means of clips 26. This drip funnel is held in position to receive any chaff, grit, heavy dirt or whole grain which may drop from the belt 14 at the turn thereof or which may gravitate through the opening between the belt 14 and the upper edge of the throat wall $20^a$. The material caught in the drip funnel 23 is conveyed into the pipe reach $22^a$ through the restricted outlets 24, which, while permitting of the flow of such material into the pipe reach $22^a$, prevents the undue entry of air thereto. Yet, upon entering the pipe reach 22ª, this material is readily carried away by the relatively great volume of air required to be passed through the pipe 22 from the hood 21 in order to effect the picking up of the light dust at the hood.

From the foregoing, it will be understood that my invention is particularly advantageous in that the constructional requirements are simplified and rendered less expensive than usual and in that the usual equipment and maintenance requirements are minimized, the usual separate pipe from the drip funnel to the suction main with its individual stream of material entraining air being entirely eliminated.

Changes in the specific form of my invention, as herein disclosed, may be made within the scope of what is claimed without departing from the spirit of my invention.

Having described my invention, what I claim as new and desire to protect by Letters Patent is:

In apparatus for collecting dust from a conveyer belt at the discharge end thereof, a spout for receiving the discharge from said conveyer, said spout having a head formed with a substantially horizontal wall, a depending flange formed at the forward end of said wall, a hood disposed in advance of said depending flange and means for connecting said hood to a source of suction.

ARTHUR B. OSGOOD.